United States Patent [19]

Inui et al.

[11] Patent Number: 4,536,774
[45] Date of Patent: Aug. 20, 1985

[54] THERMAL HEAD DRIVE CIRCUIT

[75] Inventors: Toshiharu Inui; Haruhiko Moriguchi, both of Kanagawa, Japan

[73] Assignee: Fuji Xerox Co., Ltd., Tokyo, Japan

[21] Appl. No.: 591,859

[22] Filed: Mar. 21, 1984

[30] Foreign Application Priority Data

Apr. 1, 1983 [JP] Japan .................................. 58-55266
Apr. 30, 1983 [JP] Japan .................................. 58-74900

[51] Int. Cl.³ .......................................... G01D 15/10
[52] U.S. Cl. ............................... 346/76 PH; 400/120; 219/216
[58] Field of Search ............. 346/76 PH, 76; 219/216, 219/216 PH; 400/120, 52; 358/78, 296, 298; 250/316.1, 317.1, 318

[56] References Cited

U.S. PATENT DOCUMENTS 4,415,908 11/1983 Sugiuka ........................... 346/76 PH
4,464,669 8/1984 Sekiya et al. .................... 346/76 PH Primary Examiner—E. A. Goldberg
Assistant Examiner—Arthur G. Evans
Attorney, Agent, or Firm—Finnegan, Henderson, Farabow, Garrett & Dunner

[57] ABSTRACT

A thermal head drive circuit with the input connected to a source of printing data and the output connected to a thermal head including heater elements, so as to improve the printing quality of a thermal head recording apparatus for printing successive lines. Improved printing quality is effected by using data from previously printed lines to compute a corrected pulse energy for the line being printed. The circuit uses a heat accumulation state operator for computing the heat storage state of each of the heater elements constituting a thermal head, a pulse energy operator for computing a printing pulse energy to be applied to each of the heater elements, a memory for storing the electrical pulse energy used in the previously printed line, and either a pulse interval detector for detecting a time interval from a termination of printing of a previously printed line, or a temperature detector for detecting an internal-temperature of a thermal head. The pulse energy operator uses data from the heat accumulation state operator, from the memory which has data on the pulse energy used in previously printed lines, and from either the pulse interval detector or the temperature detector. The output of the pulse energy operator is connected to a pulse applying circuit which is used to drive the heater elements of a thermal head.

20 Claims, 15 Drawing Figures

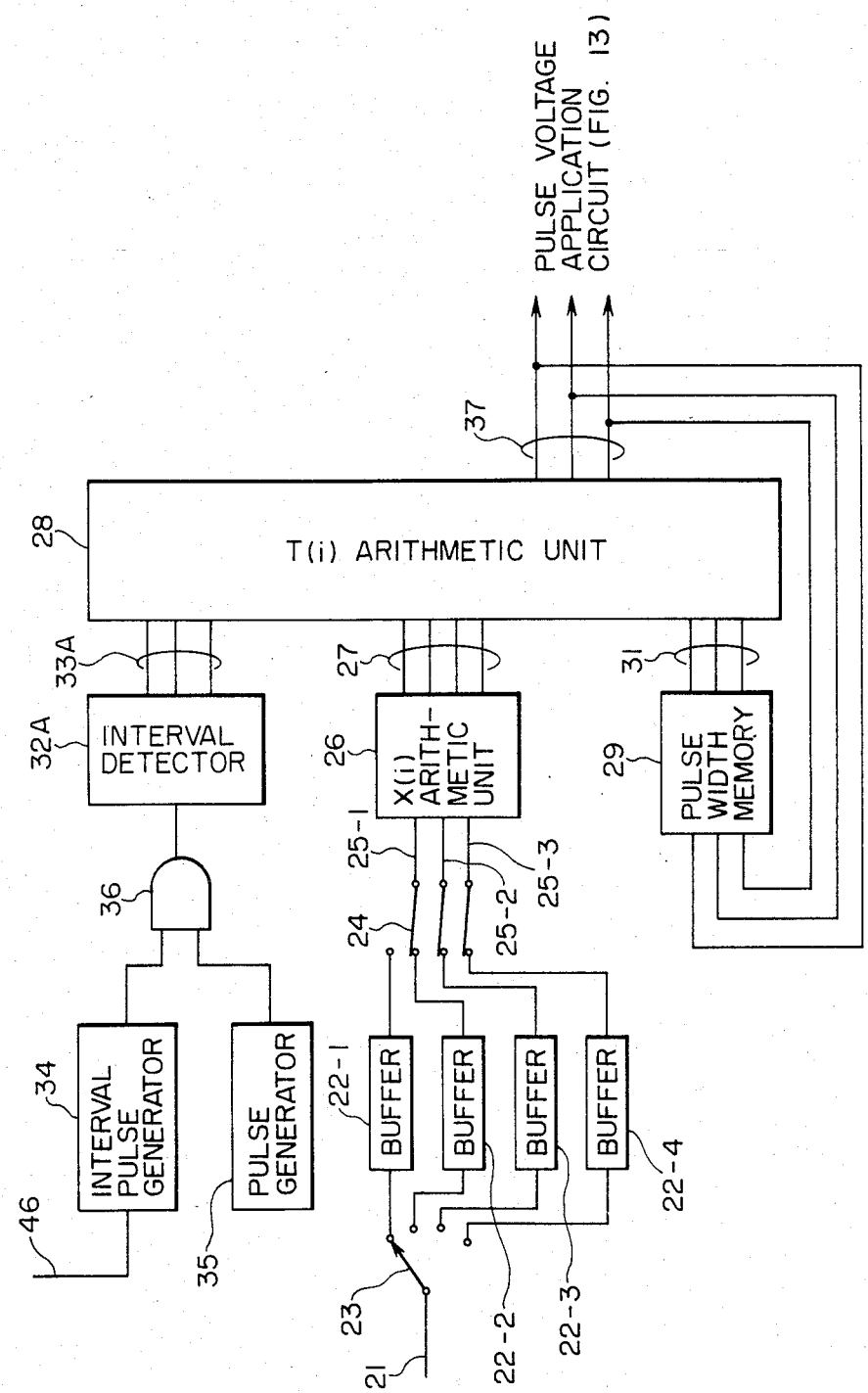

THERMAL HEAD DRIVE CIRCUIT

FIELD OF THE INVENTION

The present invention relates to a thermal head drive circuit for use in a thermal recording apparatus such as facsimile equipment or a printer which employs a thermal head.

DESCRIPTION OF THE PRIOR ART

A thermal recording apparatus, in which recording is thermally formed by using a thermal-sensitive recording paper or other thermal-sensitive medium, is widely used in facsimile equipment. In such a thermal recording apparatus, a thermal head in which a matrix of individually actuatable heater elements are aligned usually is used as a printing head. Thermal energy generated from the thermal head for printing, but retained in the head, can cause degradation in printing quality.

A typical problem is heat accumulation during high speed recording. The heat generated inside the heater elements by the application of electrical energy is partly used for printing and partly radiated through a substrate of the printer. However, when the thermal heater is driven at a high speed below a printing cycle of 10 milliseconds, the next printing operation may be initiated before heat has been sufficiently radiated so that heat is stored in at least some heater elements. As a result, the temperatures in the respective heater elements at the time of printing do not become uniform, so that printed dots may be different from each other in size and/or in density. Such printing density is influenced also by a variation in internal temperature of the thermal recording device.

In a thermal recording device of this type where the printing speed varies from line to line, the degree of cooling at the heating elements varies from line to line, which further results in a non-uniform printing density.

To cope with such deterioration in picture quality due to thermal energy, this invention sets the printing head energy at an optimum value by line, by adjusting the voltage or pulse width to be applied to the thermal head. FIG. 1 is a block diagram showing the schematic arrangement of a conventional thermal head drive circuit, which is found in the prior art. In this circuit, bits for printing black dots included in a printing data 12 supplied to a thermal head 11 are counted by a counter 13 by line. A control signal 14 in accordance with the value of count is applied to a thermal energy control circuit 15. The thermal energy control circuit 15 may be either a pulse amplitude setting circuit or a pulse width setting circuit, and adjust application pulses 16 to be applied to respective heater elements when the thermal head 11 performs its printing operation onto the next line with respect to which the counter had performed its counting operation.

The problem of degradation in picture quality from the thermal energy generated from the thermal head for printing cannot be prevented by uniform control of the whole thermal head nor can it be prevented with respect to the individual heater elements. Such a uniform control allows the local temperature to rise or to fall on the individual heater elements, and results in degration in printing quality.

Consequently, a need exists for improvements in thermal head drives of this type in which thermal energy to be supplied to respective heater elements is individually adjusted to thereby obtain stable printing quality.

SUMMARY OF THE INVENTION

The present invention provides a thermal head drive circuit which adjusts individually the thermal energy to be applied to respective heating elements and can provide the stable quality of printing even if the recording speed of the thermal recording device varies from line to line and even if the internal temperature of the recording device fluctuates.

In a first embodiment of this invention, the thermal head drive circuit for a line sequential recording system is provided with a heat accumulation state arithmetic unit for computing heat accumulation states of respective heating elements composing the thermal head, a pulse width arithmetic unit for receiving as input data at least the aforesaid heat accumulation states and widths of print pulses which were applied to the thermal head when the previously printed line was printed and computing the widths of print pulses to be applied to respective heating elements, and an interval detector for detecting the time interval from the print termination of the previously printed line to the print start of the present line to be printed. The drive circuit uses the time interval detected by the interval detector to correct the computed results of the heat accumulation state arithmetic unit and of the pulse width arithmetic unit.

In a second embodiment of this invention, the thermal head drive circuit is provided with the aforesaid heat accumulation state arithmetic unit and the aforesaid pulse width arithmetic unit, and further with a temperature detector for detecting the internal temperature of the recording device in which the thermal head is disposed. The drive circuit uses the temperature detected by the temperature detector to correct the computed results of the heat accumulation state arithmetic unit and of the pulse width arithmetic unit.

BRIEF DESCRIPTION OF THE DRAWINGS

FIG. 2A is a schematic diagram of a thermal head drive circuit including an interval detector, illustrating a first embodiment of the present invention.

DESCRIPTION OF THE PREFERRED EMBODIMENTS

Figure 1:
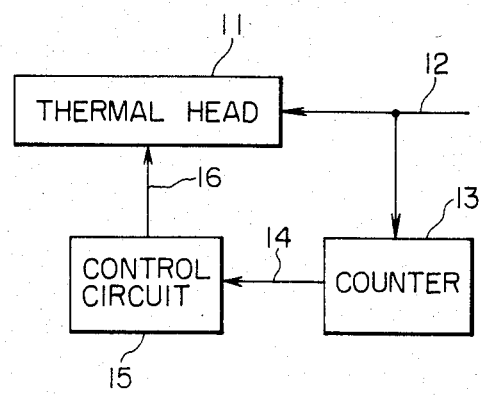
FIG. 1 is a block diagram showing a schematic arrangement of a conventional thermal head drive circuit.

FIG. 2A shows the thermal head drive circuit according to a first embodiment of this invention. This circuit includes four line buffers 22-1 to 22-4 in which print data 21 per line are successively written. A selector 23 is supplied with a line synchronizing signal (not shown) and switches cyclicly its contact from one line buffer to another each time the print data 21 for one line are supplied. When selector 23 is selecting the first line buffer 22-1 as shown in FIG. 2, the fourth line buffer 22-4 stores the printing data for the line onto which printing or recording is going to be made next. At this time, the third and second buffers 22-3 and 22-2 store, respectively, the printing data for the previously printed line, and the line before the previously printed line. On the output side of these line buffers 22-1 to 22-4 there is provided a selector 24 which is selecting three line buffers other than the line buffer into which the printing data is now being written.

In the state as shown in the drawing, the printing data is being written into the first line buffer 22-1. At this time, the output sides of the other three line buffers 22-2 to 22-4 are selected by the selector 24 and the print data 25-1 to 25-320 selected are input into an X(i) arithmetic unit 26. This X(i) arithmetic unit 26 is an operation unit for computing the heat accumulation states. The computed outputs 27 of the X(i) arithmetic unit 26 are applied to a T(i) arithmetic unit 28.

This T(i) arithmetic unit 28 is an operation unit for computing the thermal energy to be applied to respective heating elements of a thermal head discussed herein after and in response to the computation for setting widths of application pulses to be applied to the heating elements. Specifically, T(i) arithmetic unit 28 determines the pulse widths for the heater elements of the present line onto which recording is going to be performed by using three kinds of data, the computed output signals 27, an output signal 31 from a pulse width memory 29 storing respective pulse widths for the previously printed line, and an interval detection signal 33A provided from an interval detector 32A. Here, the interval detection signal 33A represents the time interval from the print termination of the previously printed line to the print start of the present line. The interval detection signal 33A is the signal obtained by logic-processing the outputs of an interval pulse generator circuit 34 and a pulse generator circuit 35 in an AND circuit 36 and by time-processing in interval detector 32A. Pulse width signal 37 determined individually with respect to respective heating elements by T(i) arithmetic unit 28 is supplied to a pulse voltage application circuit for the thermal head, which arithmetic unit will be described hereinafter.

In this thermal head drive circuit, the two states, the head heat accumulation state and the time interval during which no printing is effected, are utilized to determine the printing pulses. To achieve the above, in the first embodiment, the print pulses are provisionally determined at the first step on the basis of the heat accumulation state. Then, at the second step, the foregoing interval detection signal is read, and finally the print pulse is determined.

Figure 2B:
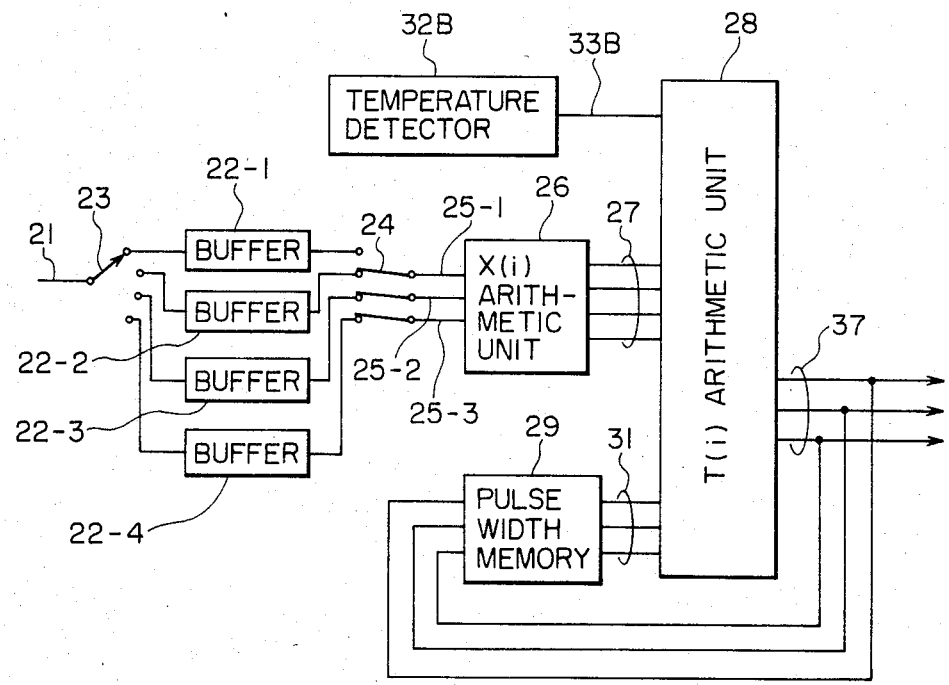
FIG. 2B is a schematic diagram of a thermal head drive circuit including a temperature detector, illustrating a second embodiment of the present invention.

FIG. 2B shows the thermal head drive circuit according to the second embodiment of this invention. In this arrangement, in place of the interval detection signal 33A, a temperature detection signal 33B given from a temperature detector 32B disposed in the vicinity of the thermal head is utilized together with the other two signals mentioned hereinabove, these composing the three kinds of data, to determine the pulse width for the present line onto which recording is now going to be performed.

Specifically, in this second embodiment, at the first step the print pulse is provisionally determined on the basis of the heat accumulation state. Then, at the second step, a correction regarding the internal temperature is performed and finally the print pulse is determined. For the convenience of explanation, in both embodiments, the pulse width of the print pulse obtained at the first step is denoted by T(i1) and the ultimate pulse width obtained at the second step is denoted by T(i2).

Figure 3:
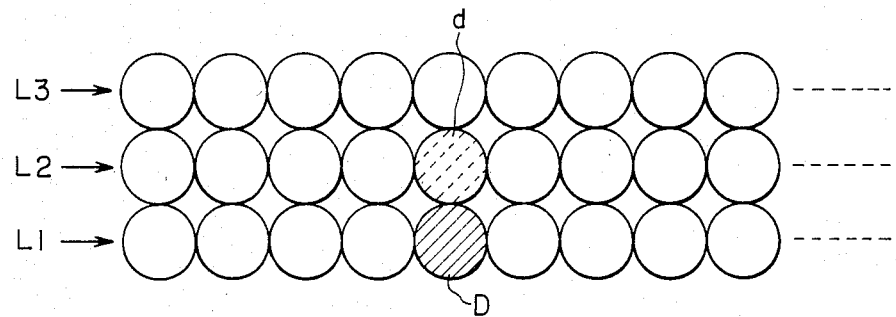
FIG. 3 is a drawing for explanation of data rows for three print lines of FIGS. 2A and 2B.

FIG. 3 is a diagram for explaining the principle of determining the printing pulse to be applied to each heating element. In this drawing, a data row L1 depicted in the lowest position represents the data, whose bits correspond to printing elements, one by one, of the present line onto which recording is now going to be performed. Also, a data row L2 depicted above data row L1 represents the data, whose bits correspond to printing elements one by one, of the just previously printed line, and a data row L3 depicted in the uppermost position represents the data, whose bits correspond to printing elements one by one, of a line printed before the just previously printed line. In data row L1, the optimum pulse width applied to the heating element corresponding to this data D (as an example) is represented by T(i2). The heat accumulation state at this position is represented by X(i). Further, a data in data row L2 corresponding to that data D, both relating to the same heating element but in this just previously printed line is represented by "d". The pulse width applied to that heating element on the basis of data d is represented by t(i2). Here, it should be noted that, in the thermal head drive circuit according to this invention, the pulse width itself is determined for each heating element irrespective of whether printing is to be performed or not. Thus, printing or non-printing operation is effected depending upon whether or not the pulse voltage is applied to individual heating elements, but, not determined directly by the pulse width itself.

In this case, the optimum application energy to be applied to the heating element corresponding to data D can be represented by the following equation:

$$T(i2) = f[X(i), t(i2), I, C]$$

where a symbol I represents the interval detected by interval detector 32A and a symbol C represents the internal temperature detected by temperature detector 32B.

Figure 4:
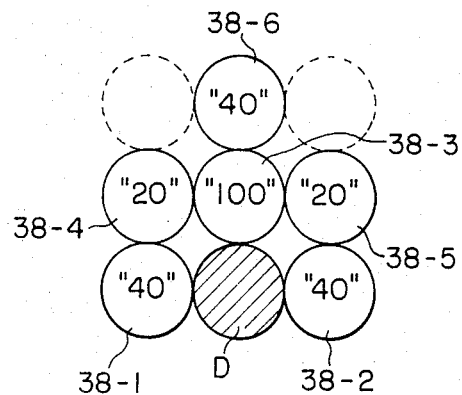
FIG. 4 is an explanatory drawing showing the principle of computing the heat accumulation state in connection with respective data of the invention.

FIG. 4 shows the principle of computing the heat accumulation state X(i) in the above equation. In this embodiment, the heat accumulation state X(i) is computed on the basis of six data pins 38-1 to 38-6 shown in solid circle lines and surrounding the data pin D. This heat accumulation state X(i) is obtained by weighting black print data out of data 38-1 to 38-6 with certain values and adding the weighted data. If the weighting value of data 38-3 (data d) which has the largest thermal influence is selected to be "100", the weighting value for data 38-1 and 38-2 in row L1 will be "40", similarly, "20" for data 38-4 and 38-5 in row L2 and "40" for data 38-6 in row L3. The following Table 1 shows sixteen gradations which are obtained by weighting the thus added heat accumulation states in according with the printing states so as to have one value out of "1" to "16", where "X(i)=0" represents the lowest heat accumulation state and "X(i)=16" represents the highest heat accumulation state.

TABLE 1

| Data |   |   |   |   |   |      |    |       |
|------|---|---|---|---|---|------|----|-------|
| 38-1 | 0 | 0 | 0 | 1 | 0 | 0...0 | 1  | 1...1 |
| 38-2 | 0 | 0 | 0 | 0 | 1 | 0...1 | 0  | 1...1 |
| 38-3 | 0 | 0 | 0 | 0 | 0 | 0...1 | 1  | 1...1 |
| 38-4 | 0 | 1 | 0 | 0 | 0 | 1...0 | 1  | 0...1 |
| 38-5 | 0 | 0 | 1 | 0 | 0 | 1...1 | 0  | 0...1 |
| 38-6 | 0 | 0 | 0 | 0 | 0 | 0...0 | 0  | 0...1 |
| X(i) | 1 | 1 | 1 | 2 | 2 | 2...10 | 10 | 11...16 |

The X(i) arithmetic unit 26 shown in FIGS. 2A and 2B receives print data 25-1 to 25-3 for three rows and extracts six data 38-1 to 38-6 therefrom. Then, the heat accumulation state X(i) is computed in accordance with the contents of Table 1 while treating these extracted data ("0" or "1") as address informations.

Figure 5:
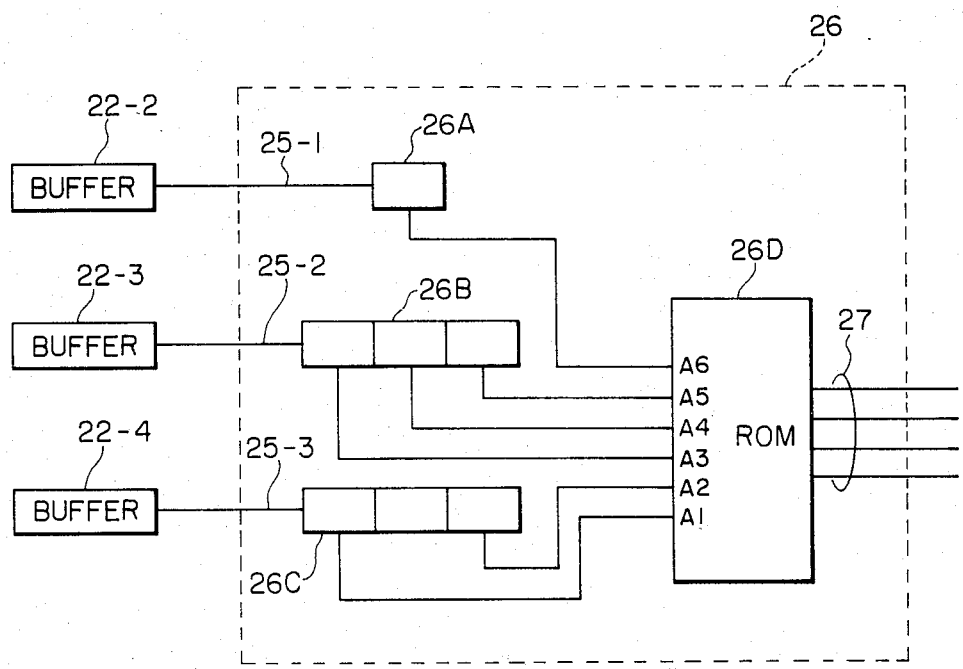
FIG. 5 is a block diagram showing the principal portion of X(i) arithmetic unit of FIGS. 2A and 2B.

FIG. 5 is a block diagram for explaining the operation of the X(i) arithmetic unit which computes the heat accumulation state at data D with the use of Table 1. The drawing shows the step in which the FIGS. 2A and 2B where selector 23 as shown in FIGS. 2A and 2B is connected to the first line buffer 22-1. In this step, the three line buffers 22-2 to 22-4 receive a not shown clock signal and commence read-out of the print data for one line per one bit at a time, under a mutually synchronized state. The two lines before printing data 27-1 read out from the second line buffer 22-2 are inputted into the X(i) arithmetic unit 26 and, after being delayed by one bit time through a not shown delay element, received by a one-bit data latch 26A. Print data 25-2 and 25-3, for the one line before and the line onto which printing is now going to be performed, read out from third line buffer 22-3 and fourth line buffer 22-4, are received by corresponding three-bit shift registers 26B and 26C, respectively. The data latched in the one-bit data latch 26A are applied to an address terminal A6 of a ROM (read only memory) 26D one bit at a time. The data in the three-bit shift register 26B is subjected to the serial-parallel conversion. The oldest data are applied to address terminals A5 to A3 of ROM 26D in the order of oldness. The other three-bit shift register 26C applies the oldest data to an address terminal A2 and the newest data to an address terminal A1.

ROM 26D stores the data table shown in Table 1. Address terminals A1 to A6 correspond, respectively, to data 38-1 to 38-6 as shown in Table 1. The heat accumulation state X(i) obtained from the table is supplied to T(i) arithmetic unit 28 in the form of a computed output 27.

The T(i) arithmetic unit 28 receives the pulse width data for the respective heating elements for the previously printed line by means of the output signal 31 supplied from pulse width memory 29. Then, on the basis of the heat accumulation states X(i) determined for respective heating elements, the pulse widths T(i1) are computed for the line onto which recording is now going to be printed. The thus obtained pulse widths are corrected so as to finally determine the pulse widths T(i2).

Figure 6:
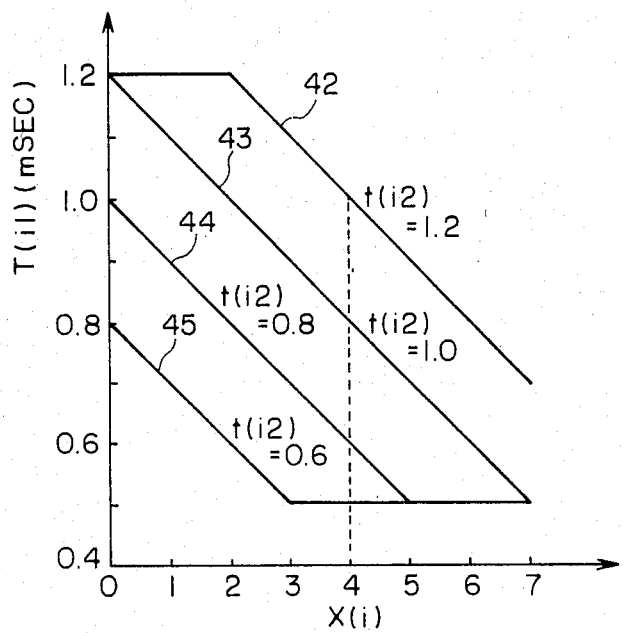
FIG. 6 is an explanatory drawing showing the relationship between heat accumulation state X(i) and pulse width T(il) in T(i) arithmetic unit of FIGS. 2A and 2B.

FIG. 6 shows the relation between the heat accumulation state X(i) and the pulse width T(i1) in the T(i) arithmetic unit. Lines 42 to 45 represent the characteristics with values indicating the finally determined pulse widths t(i2) for the previously printed line (in the unit of "msec"). As an example, assume that the heat accumulation state X(i) is "4" for an individual data. Then, if the pulse width of a voltage applied to a heater element of the previously printed line were 1.2 msec, it will be reduced to 1.0 msec at this time of print. Similarly, if the previously printed line pulse width were 0.6 msec, it will be shortened to 0.5 msec at this time of print.

Figure 7:
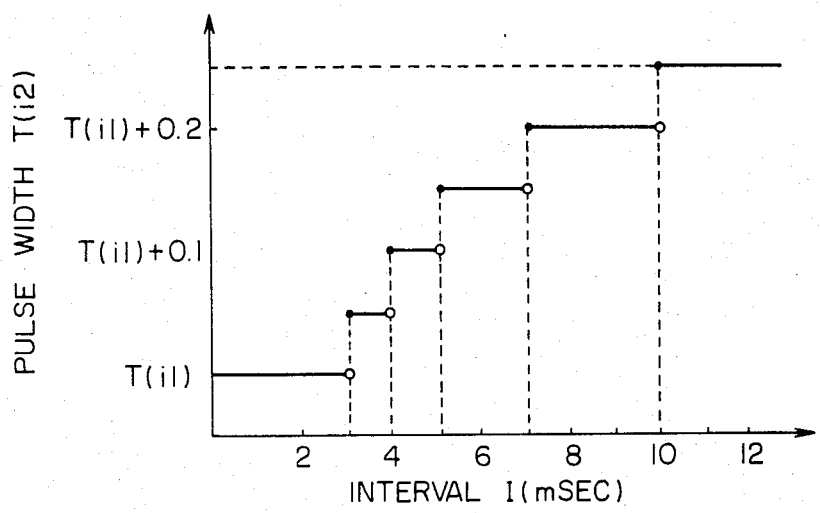
FIG. 7 is an explanatory drawing showing the relationship between pulse width T(i2) and time interval I during which no printing is performed between print lines in T(i) arithmetic unit of FIG. 6.

FIG. 7 shows the process of correcting the pulse width in compliance with the interval I during which no print is performed between two lines, that is performed also by T(i) arithmetic unit in the first embodiment. That is, if the interval I is shorter than 3 msec, the pulse width T(i1) obtained in the process shown in FIG. 6 is treated as the final pulse width T(i2) without modification. On the other hand, in case the pulse width is 3 msec and longer, the pulse width T(i2) is elongated correspondingly through the correction process.

Figure 8:
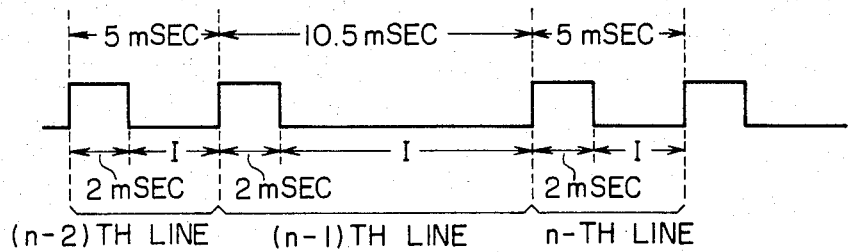
FIG. 8 is a timing diagram showing the printing state of each line.
Figure 9:
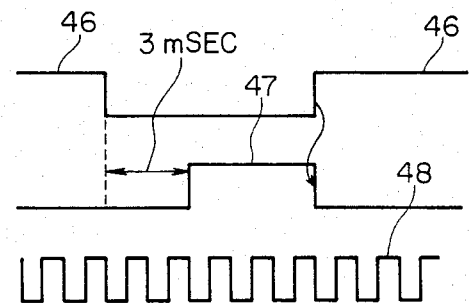
FIG. 9 is a waveform diagram for explanation of the operations of an interval pulse generator circuit and a pulse generator circuit of FIG. 2A.

FIGS. 8 and 9 are for explaining the principle of detecting the interval I for correction. Specifically, FIG. 8 shows the mode of printing of each line achieved by the thermal recording device according to this embodiment. It is assumed that printing of each line be done for 2 msec; but, respective intervals I from the print termination to the following print start are not uniform due to the operation of a data transmitting device (such as a computer) relative to the recording device. As a result, the recording time varies from line to line. In the example shown in FIG. 8, the recording time each of the n-2th line and the nth line is 5 msec, whereas it is 10.5 msec for the n-1th line. Accordingly, the interval I for each of the n-2th line and the nth line is short and 3 msec, but long and 8.5 msec for the n-1th line.

Interval pulse generator circuit 34 shown in FIG. 2A receives a print pulse 46 ((a) in FIG. 9) from a not shown thermal head drive control circuit. This circuit 34 detects the falling edge in time of each print pulse 46, i.e., the moment of print termination, and builds up an interval pulse signal 47 ((b) in FIG. 9) at the moment when 3 msec has lapsed after the foregoing detection. The risen interval pulse signal 47 falls in response to the rising of the print pulse 46 for the next line. On the other hand, the pulse generator circuit 35 is outputting a clock pulse signal 49 at the period of 1 msec. AND circuit 36 passes the clock pulse signal 48 to interval detector 32A while the interval pulse signal 47 is at H (high) level, the passed clock pulse signal being utilized as a data for interval computation of each line. For example, the interval I for the n-1th line is 8.5 msec, so that the interval detector unit 32A counts eight pulses and indicates that this interval I is not shorter than 6 msec but shorter than 10 msec. By the interval detection signal 33A indicating the thus computed results, T(i) arithmetic unit 28 corrects the pulse width T(i1) and provides the pulse width T(i2).

Figure 10:
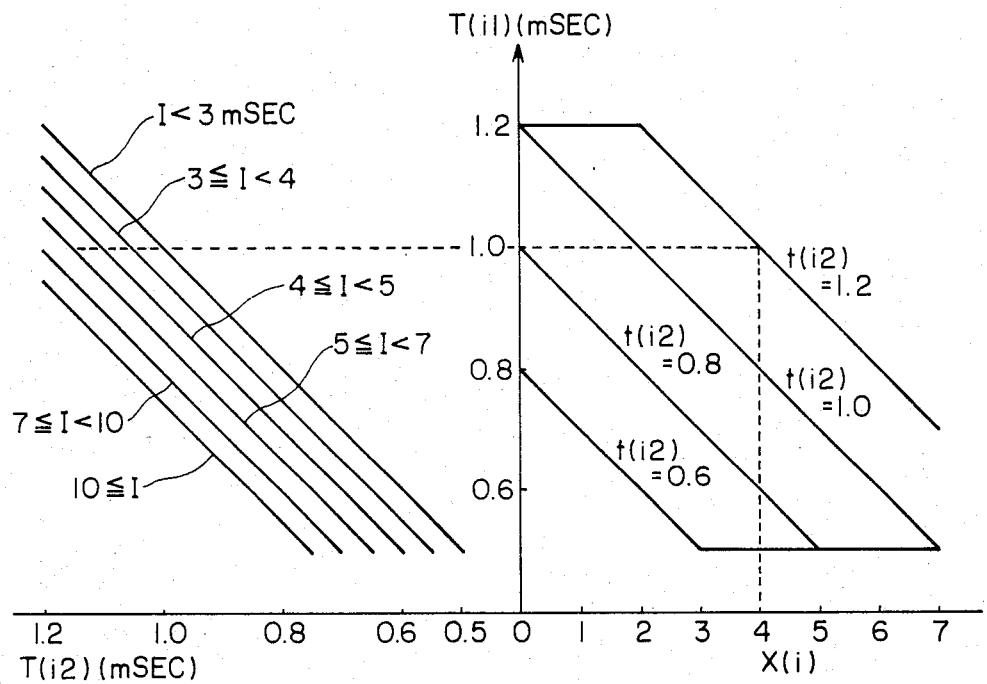
FIG. 10 is a characterizing drawing showing an input-output property of T(i) arithmetic unit in relation to the interval of FIG. 2A.

FIG. 10 shows the actual input-output relation of T(i) arithmetic unit which will be realized by ROM, for example, and combining the principles of FIGS. 6 and 7. As an example, assume that the heat accumulation state X(i) for some data pin were "4". If the pulse width t(i2) for that data at the one-past line is 1.2 msec, the pulse width T(i1) becomes 1.0 msec. Then, if the interval I is shorter than 3 msec, the pulse width T(i2) becomes 1.0 msec too. Otherwise, if the interval I is 4 msec, the pulse width is elongated to 1.1 msec.

Figure 11:
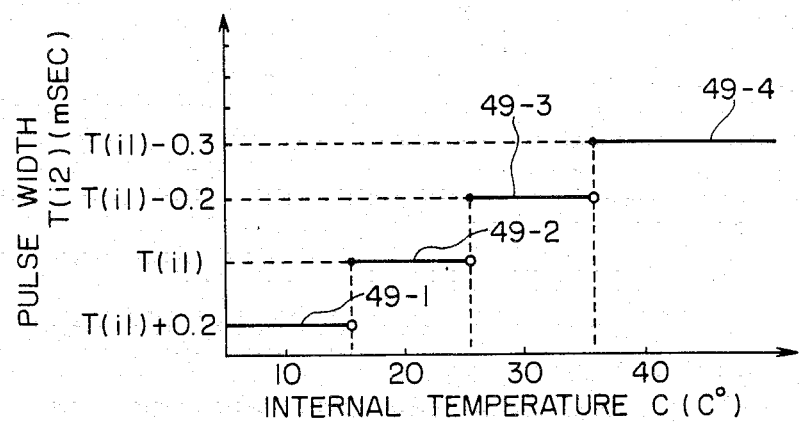
FIG. 11 is an explanatory drawing showing the relationship between internal temperature C and pulse widths T(i2) in T(i) arithmetic unit of FIG. 2B.

FIG. 11 show the correction process against the pulse width in compliance with the internal temperature C in the T(i) arithmetic unit, according to the second embodiment and relating to FIG. 6. In FIG. 11, lines 49-1 to 49-4 represent the relationship between the two kinds of pulse widths T(i1) and T(i2) with respect to the internal temperature detected by temperature detector 32B (FIG. 2B). That is, when the internal temperature C is under the relation of $15° \geq C < 25°$, the pulse width T(i1) obtained in FIG. 6 becomes the pulse width T(i2) without modification. If the internal temperature C increased more than the foregoing, the pulse width is corrected correspondingly so that T(i2) becomes shortened. On the other hand, if it is a lower temperature, the pulse width T(i2) is made longer by correction.

Figure 12:
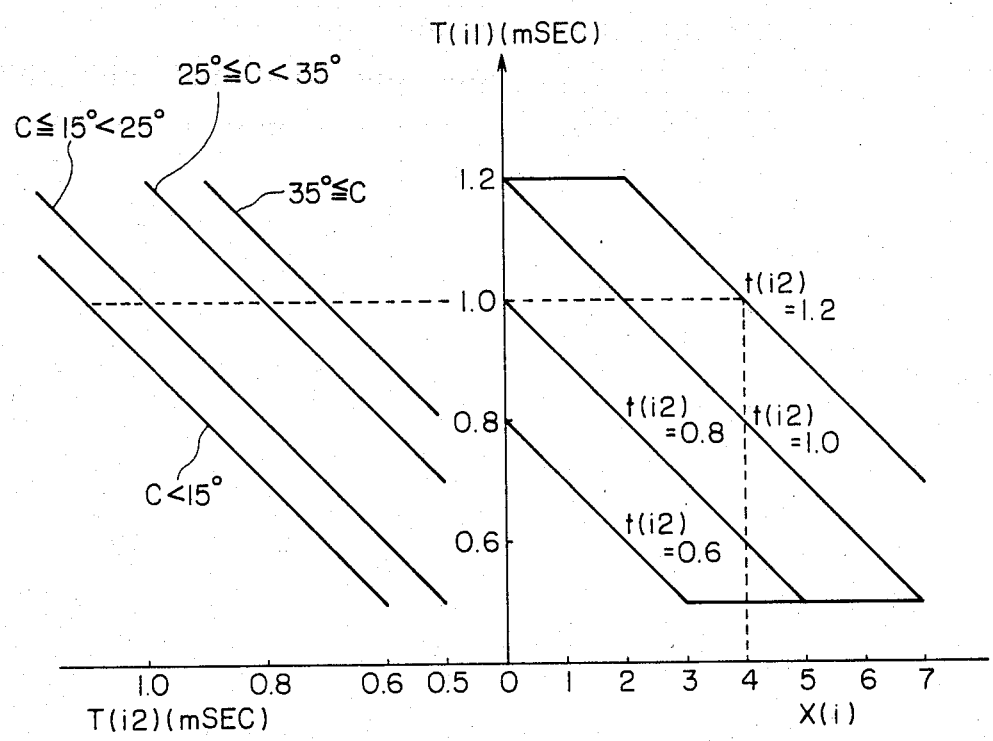
FIG. 12 is a characterizing drawing showing an input-output property of T(i) arithmetic unit in relation to the internal temperature of FIG. 2B.

FIG. 12 is a summarized drawing of FIGS. 6 and 11, described hereinabove, and illustrates the input-output relation of T(i) arithmetic unit which is realized by ROM, for example. Similarly to the foregoing example, assume that the heat accumulation state X(i) for some data were "4". If the pulse width t(i2) in the one-past line is 1.2 msec, the pulse width T(i1) becomes 1.0 msec. At this time, if the internal temperature C is not lower than 35° C., the pulse width T(i2) is shortened to 0.7 msec. If the temperature is not lower than 15° C. but lower than 25° C., "1.0 msec" is held unchanged. Otherwise, if the temperature is lower than 15° C., the pulse width T(i2) is elongated to 1.1 msec. The thus obtained pulse width signals 34 corresponding to each bit of the printing data are supplied to the thermal head, whereby the heating of each heater element is controlled in accordance with the different pulse widths, respectively.

Figure 13:
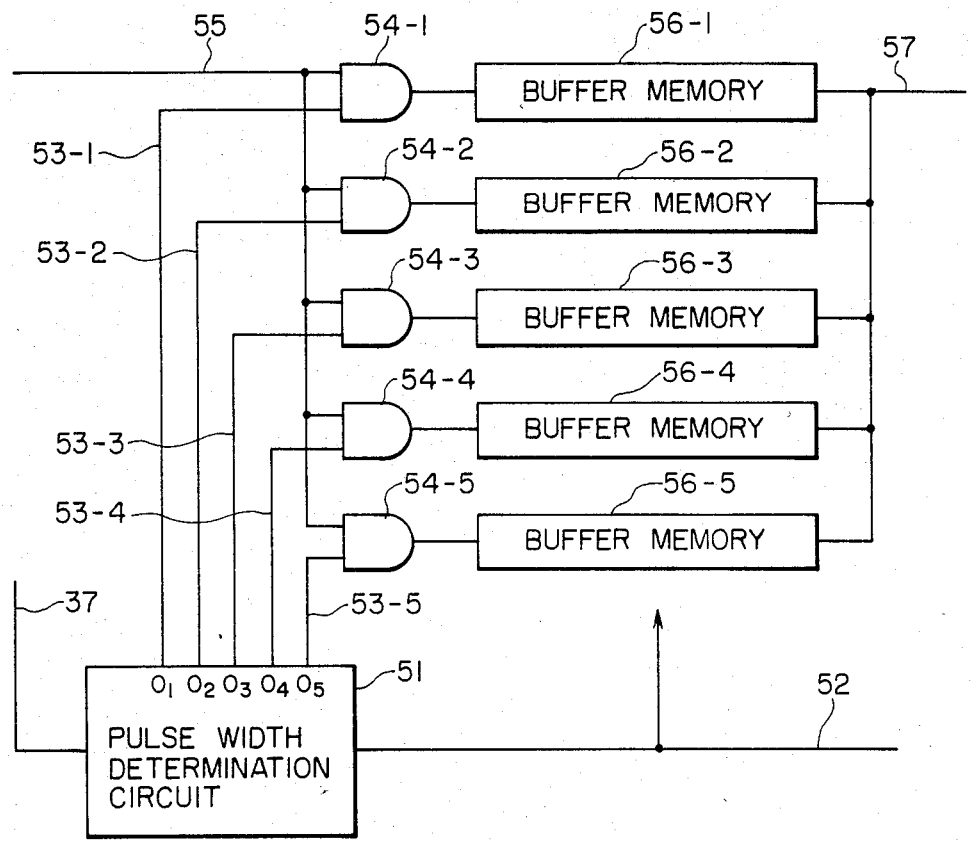
FIG. 13 is a block diagram of a pulse voltage application circuit of FIGS. 2A and 2B.

FIG. 13 shows a pulse voltage application circuit for achieving such a heating control. Included in this circuit is a pulse width determination circuit 51 which receives the pulse width signals 34 per one printing element at a time in synchronism with a clock signal 52 and provides at its output terminals 01 to 05 the gate control signals 53-1 to 53-5 corresponding to the pulse width. Pulse width determination circuit 51 divides the pulse width for printing into five stages from 0.5 msec to 1.2 msec; (that is 0.5 msec, 0.6 msec, 0.8 msec, 1.0 msec and 1.2 msec) thereby to adjust the heating value of the heating element. When the pulse width is 0.5 msec, only the first gate control signal 53-1 becomes H (high) level. In the case of 0.6 msec the first and second gate control signals 53-1 and 53-2 become H level. In the case of 0.8 msec the first to third gate control signals 53-1 to 53-3 become H level. In the case of 1.0 msec the first to fourth gate control signals 53-1 to 53-4 become H level. Further, in the case of 1.2 msec, all the gate control signals 53-1 to 53-5 become H level. If any pulse width T differing from the foregoing five grade pulse widths is obtained by T(i) arithmetic unit 28, one of the five grades is selected in accordance with the following: 0.5 msec for $T \leq 0.55$, 0.6 msec for $0.55 < T \leq 0.7$, 0.8 msec for $0.7 < T \leq 0.9$, 1.0 msec for $0.9 < T \leq 1.1$, and 1.2 msec for $1.1 < T$.

The gate control signals 53-1 to 53-5 are applied to corresponding two-input AND gates 54-1 to 54-5, respectively. To those AND gates 54-1 to 54-5, the pulse width signal 37 delayed by a not shown delay circuit and the print data 55 corresponding to each heating element are supplied. Accordingly, for example, if a signal "1" is applied as the print signal 55 and if the pulse width for printing is 0.8 msec, signal "1" is provided each from first to third AND gates 54-1 to 54-3 and signal "0" is provided each from remaining AND gates 54-4 and 54-5. These output signals are applied to five buffer memories 56-1 to 56-5 disposed in correspondence with AND gates 54-1 to 54-5. It will be understood that when the print data 55 for one line has been supplied to respective AND gates 54-1 to 54-5 entirely, the print data for one line is stored in the form of the pulse width data in respective buffer memories 56-1 to 56-5.

Figure 14:
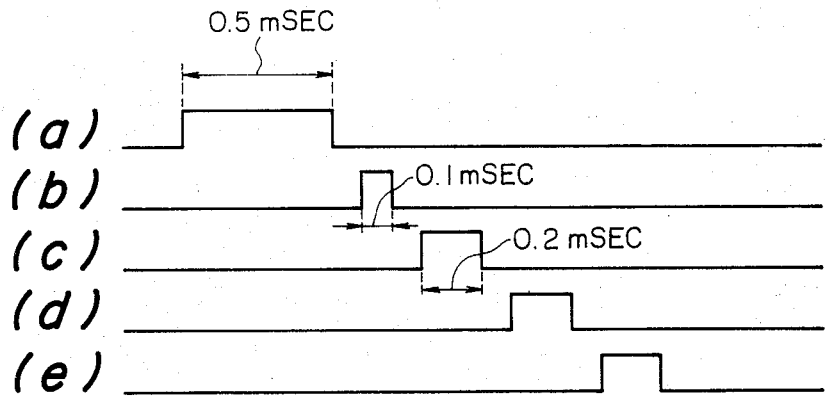
FIG. 14 is a timing diagram showing an application timing of the pulse voltage of FIG. 13.

The thus stored data are supplied to a drive unit for the thermal head in the form of a pulse width control data 57. In this drive unit, the contents of first buffer memory 56-1 are set into a not shown shift register of the thermal head and, as shown in FIG. 14(a), printing is performed with the application voltage of 0.5 msec in duration. Then, the contents of second buffer memory 56-2 are set into the shift register and printing is performed with the application voltage of 0.1 msec as shown in FIG. 14(b) Similarly, the contents of third to fifth buffer memories 56-3 to 56-5 are sequentially set into the shift register and the voltages are applied for 0.2 msec each as shown in FIG. 14(c) to (e). As a result, if the heating element should achieve printing with the pulse width of 0.8 msec, for example, three times of power application covering (a) to (c) of FIG. 14 are effected to heat up to a desired temperature.

While, in the first embodiment, the interval detection signal 33A provided from interval detector 32A is applied to T(i) arithmetic unit 28, it is also possible to apply the same to X(i) arithmetic unit 26 for computing the heat accumulation state thereby to determine indirectly the pulse width.

Though the temperature detector 32B is disposed inside the thermal recording device in the second embodiment, this invention should not be limited to such an arrangement.

Furthermore, though the temperature detection signal 33B detected by temperature detector 32B is applied to T(i) arithmetic unit 28 in the second embodiment, it is also possible to apply the same to X(i) arithmetic unit 26 for computing the heat accumulation state thereby to determine indirectly the pulse width.

As described in detail hereinabove, this invention controls individually the heating value per heating element in consideration of the thermal property of the thermal head. Accordingly, even in the case that black printing is continuing or a half tone print is to be reproduced, there is no need of settling specifically a time duration for the heat radiation of the thermal head, a uniform and high qualitative printing can be realized, and a high speed printing is allowed.

What is claimed is:

1. A thermal head drive circuit with an input connected to a source of printing data, and an output connected to a thermal head including individually actuatable and heatable heater elements, for printing successive lines comprising:

a. a pulse-applying circuit having an input and an output, the output of said pulse-applying circuit being connected to the input of said thermal head, and the input of said pulse-applying circuit receiving pulse energy signals for applying printing pulse energy data to said thermal head;

b. storage means having an input and an output, the printing data from said printing source being successively read line by line into the input of said storage means;

c. an arithmetic heat accumulation state operator having an input and an output, the input of said operator being connected to the output of said storage means;

d. a pulse interval detector having an input and an output for detecting the time interval from termination of printing of a previously printed line to initiation of printing of the line next to be printed;

e. a memory having an input and an output for storing the pulse energy signals used in printing said previously printed line; and f. pulse energy operator means having inputs and an output for determining the pulse energy signals to be applied to each of said heater elements for said line next to be printed, the inputs of said pulse energy operator means being connected to the outputs of said arithmetic heat accumulation state operator, said memory and said pulse interval detector, and the output of said pulse energy operator means being connected to the input of said pulse-applying circuit.

2. A thermal head drive circuit as recited in claim 1 wherein said storage means comprises:
a. a plurality of line buffers into which printing data are successively read line by line;
b. a first selector for cyclically selecting an input of one of said plurality of line buffers;
c. a second selector connected to the output of said plurality of line buffers and to the input of said arithmetic heat accumulation state operator, for selecting the output sides of the ones of said plurality of line buffers not being selected by said first selector.

3. A thermal head drive circuit as recited in claim 2 wherein said arithmetic heat accumulation state operator comprises means for determining an arithmetic heat accumulation state using the output data from said second selector.

4. A thermal head drive circuit as recited in claim 3 wherein said means for determining the arithmetic heat accumulation state comprises a read-only memory.

5. A thermal head drive circuit as recited in claim 1, further including means for converting pulse energy data to pulses by varying the pulse width.

6. A thermal head drive circuit as recited in claim 1, further including means for converting pulse energy to pulses by varying the pulse amplitude.

7. A thermal head drive circuit as recited in claim 1, 2, 3, 4, 5, or 6, wherein said pulse energy operator means comprises:
a. an input for receiving arithmetic heat accumulation state data from said arithmetic heat accumulation state operator, wherein said arithmetic heat accumulation state data are represented by X(i);
b. an input for receiving pulse width data from said next previously printed line from said memory;
c. an input for receiving pulse interval detection data from said pulse interval detector;
d. a printing pulse width;
e. means for setting values for said printing pulse width according to a predetermined relationship between the values of said arithmetic heat accumulation state data and said next previously printed line pulse width data; and
f. means for forming output pulse width data, said output pulse width data being determined according to a predetermined relationship between said printing pulse width and said pulse interval detection data.

8. A thermal head drive circuit as recited in claim 7, wherein said pulse energy operator means further comprises a read-only memory.

9. Thermal head drive circuit as recited in claim 1, wherein said pulse-applying circuit comprises:
a. a pulse energy determining circuit for receiving pulse energy signals from said pulse energy operator means;
b. a plurality of AND gates for receiving gate control signals from said pulse energy determining circuit; and
c. a plurality of buffer memories for receiving thermal head printing data from said AND gates and with an output of said buffer memories connected to a drive section of said thermal head.

10. Pulse applying circuit as recited in claim 9, wherein said plurality of buffer memories comprise:
a. a first buffer memory connected to an input of a shift register of said thermal head, wherein a first signal from said first buffer memory causes said thermal head to print with a first pulse;
b. a second buffer memory connected to an input of said shift register of said thermal head, wherein a second signal from said second buffer memory causes said thermal head to print with a second pulse which is longer than said first pulse;
c. a third buffer memory connected to an input of said shift register of said thermal head, wherein a third signal from said third buffer memory causes said thermal head to print with a third pulse which is longer than said first pulse plus said second pulse;
d. a fourth buffer memory connected to an input of said shift register of said thermal head, wherein a fourth signal from said fourth buffer memory causes said thermal head to print with a fourth pulse which is longer than said first through third pulses; and
e. a fifth buffer memory connected to an input of said shift of said thermal head, wherein a fifth signal from said fifth buffer memory causes said thermal head to print with a fifth pulse which is longer than said first through fourth pulses.

11. A thermal head drive circuit with an input connected to a source of printing data, and an output connected to a thermal head including individually actuatable and heatable heater elements, for printing successive lines comprising:
a. a pulse-applying circuit having an input and an output, the output of said pulse-applying circuit being connected to the input of said thermal head, and the input of said pulse-applying circuit receiving pulse energy signals for applying printing pulse energy data to said thermal head;
b. storage means having an input and an output, the printing data from said printing data source being successively read line by line into the input of said storage means;

c. an arithmetic heat accumulation state operator having an input and an output, the input of said operator being connected to the output of said storage means;

d. a temperature detector having an input and an output for detecting an internal temperature in said thermal head;

e. a memory having an input and an output for storing the pulse energy signals used in printing the line immediately previously printed; and f. pulse energy operator means having inputs and an output for determining the pulse energy signals to be applied to each of said heater elements for said line next to be printed, the inputs of said pulse energy operator means being connected to the outputs of said arithmetic heat accumulation state operator, said memory and said temperature detector, and the output of said pulse energy operator means being connected to the input of said pulse-applying circuit.

12. A thermal head drive circuit as recited in claim 11 wherein said storage means comprises:
   a. a plurality of line buffers into which printing data are successively read line by line;
   b. a first selector for cyclically selecting an input of one of said plurality of line buffers;
   c. a second selector connected to the output of said plurality of line buffers and to the input of said arithmetic heat accumulation state operator, for selecting the output sides of the ones of said plurality of line buffers not being selected by said first selector.

13. A thermal head drive circuit has recited in claim 12 wherein said arithmetic heat accumulation state operator comprises means for determining an arithmetic heat accumulation state using the output data from said second selector.

14. A thermal head drive circuit as recited in claim 13 wherein said means for determining the arithmetic heat accumulation state comprises a read-only memory.

15. A thermal head drive circuit as recited in claim 11, further including a means for converting pulse energy data to pulses by varying the pulse width.

16. A thermal head drive circuit as recited in claim 11, further including a means for converting pulse energy data to pulses by varying the pulse amplitude.

17. A thermal head drive circuit as recited in claim 11, wherein said pulse energy operator means comprises:
   a. an input for receiving arithmetic heat accumulation state data from said arithmetic heat accumulation state operator, wherein said arithmetic heat accumulation state data are represented by $X(i)$;
   b. an input for receiving pulse width data from said next previously printed line from said memory;
   c. an input for receiving temperature detection data from said temperature detector;
   d. a printing pulse width;
   e. means for setting values for said printing pulse width according to a predetermined relationship between the values of said arithmetic heat accumulation state data and said next previously printed line pulse width data; and
   f. means for forming output pulse width data, said output pulse width data being determined according to a predetermined relationship between said printing pulse width and said temperature detection data.

18. A thermal head drive circuit as recited in claim 17, wherein said pulse energy operator means further comprises a read-only memory.

19. Thermal head drive circuit as recited in claims 11, wherein said pulse applying circuit comprises:
   a. a pulse energy determining circuit for receiving output pulse energy signals from said pulse energy operator means;
   b. a plurality of AND gates for receiving gate control signals from said pulse energy determining circuit; and
   c. a plurality of buffer memories for receiving thermal head printing data from said AND gates and with an output of said buffer memories connected to a drive section of said thermal head.

20. Pulse applying circuit as recited in claim 9, wherein said plurality of buffer memories comprise:
   a. first buffer memory connected to an input of a shift register of said thermal head, wherein a first signal from said first buffer memory causes said thermal head to print with a first pulse;
   b. second buffer memory connected to an input of said shift register of said thermal head, wherein a signal from said second buffer memory causes said thermal head to print with a second pulse which is longer than said first pulse;
   c. third buffer memory connected to an input of said shift register of said thermal head, wherein a third signal from said third buffer memory causes said thermal head to print with a third pulse which is longer than said first pulse plus said second pulse;
   d. fourth buffer memory connected to an input of said shift register of said thermal head, wherein a fourth signal from said fourth buffer memory causes said thermal head to print with a fourth pulse which is longer than said first through third pulses; and
   e. fifth buffer memory connected to an input of said shift of said thermal head, wherein a fifth signal from said fifth buffer memory causes said thermal head to print with a fifth pulse which is longer than said first through fourth pulses.

* * * * *